US006671669B1

(12) United States Patent
Garudadri et al.

(10) Patent No.: US 6,671,669 B1
(45) Date of Patent: Dec. 30, 2003

(54) COMBINED ENGINE SYSTEM AND METHOD FOR VOICE RECOGNITION

(75) Inventors: Harinath Garudadri, San Diego, CA (US); David Puig Oses, San Diego, CA (US); Ning Bi, San Diego, CA (US); Yingyong Qi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 253 days.

(21) Appl. No.: 09/618,177

(22) Filed: Jul. 18, 2000

(51) Int. Cl.$^7$ .............................................. G10L 15/28
(52) U.S. Cl. ...................................... 704/255; 704/256
(58) Field of Search ......................................... 704/255

(56) References Cited

U.S. PATENT DOCUMENTS

| | | | | | |
|---|---|---|---|---|---|
| 4,587,670 | A | * | 5/1986 | Levinson et al. | 704/256 |
| 4,783,804 | A | * | 11/1988 | Juang et al. | 704/245 |
| 4,852,180 | A | * | 7/1989 | Levinson | 704/256 |
| 5,167,004 | A | * | 11/1992 | Netsch et al. | 704/200 |
| 5,222,190 | A | * | 6/1993 | Pawate et al. | 704/200 |
| 5,414,796 | A | * | 5/1995 | Jacobs et al. | 704/201 |
| 5,450,522 | A | * | 9/1995 | Hermansky et al. | 704/200.1 |
| 5,537,647 | A | * | 7/1996 | Hermansky et al. | 704/200.1 |
| 5,606,644 | A | * | 2/1997 | Chou et al. | 704/243 |
| 5,754,978 | A | * | 5/1998 | Perez-Mendez et al. | 704/239 |
| 5,819,220 | A | * | 10/1998 | Sarukkai et al. | 704/240 |
| 5,839,103 | A | * | 11/1998 | Mammone et al. | 704/231 |
| 5,893,059 | A | * | 4/1999 | Raman | 704/236 |
| 6,003,002 | A | * | 12/1999 | Netsch | 704/236 |
| 6,014,624 | A | * | 1/2000 | Raman | 704/243 |

FOREIGN PATENT DOCUMENTS

WO   00/58945   10/2000

OTHER PUBLICATIONS

Fiscus, Jonathan G. "A Post–Processing System to Yield Reduced Error Rates: Recognizer Output Voting Error Reduction (ROVER)" IEEE Workshop on Automatic Speech Recognition and Understanding, in 8pgs. (1997).
Lawrence Rabiner and Biing Hwang Juang, *Fundamentals of Speech Recognition*, 200–238 (1993).
T. Barry et al., "The Simultaneous Use of Three Machine Speech Recognition Systems to Increase Recognition Accuracy," Proceedings of the IEEE National Aerospace and Electronics Conference Naecon, NY, US, May 23, 1994 (pp. 667–671).

* cited by examiner

*Primary Examiner*—Doris H. To
*Assistant Examiner*—Michael N. Opsasnick
(74) *Attorney, Agent, or Firm*—Philip R. Wadsworth; Charles D. Brown; Nicholas J. Pauley

(57) ABSTRACT

A method and system that combines voice recognition engines and resolves any differences between the results of individual voice recognition engines. A speaker independent (SI) Hidden Markov Model (HMM) engine, a speaker independent Dynamic Time Warping (DTW-SI) engine and a speaker dependent Dynamic Time Warping (DTW-SD) engine are combined. Combining and resolving the results of these engines results in a system with better recognition accuracy and lower rejection rates than using the results of only one engine.

15 Claims, 9 Drawing Sheets

COMBINED ENGINE SYSTEM AND METHOD FOR VOICE RECOGNITION

BACKGROUND OF THE INVENTION

I. Field of the Invention

The present invention pertains generally to the field of communications and more specifically to a novel and improved system and method for voice recognition.

II. Description of the Related Art

Voice recognition (VR) represents one of the most important techniques to endow a machine with simulated intelligence to recognize user or user-voiced commands and to facilitate human interface with the machine. VR also represents a key technique for human speech understanding. Systems that employ techniques to recover a linguistic message from an acoustic speech signal are called voice recognizers. The term "voice recognizer" is used herein to mean generally any spoken-user-interface-enabled device. A voice recognizer typically comprises an acoustic processor a feature extractor and a word decoder. The acoustic processor extracts a sequence of information-bearing features, or vectors, necessary to achieve VR of the incoming raw speech. The word decoder decodes the sequence of features, or vectors, to yield a meaningful and desired output format such as a sequence of linguistic words corresponding to the input utterance.

The acoustic processor represents a front-end speech analysis subsystem in a voice recognizer. In response to an input speech signal, the acoustic processor provides an appropriate representation to characterize the time-varying speech signal. The acoustic processor should discard irrelevant information such as background noise, channel distortion, speaker characteristics, and manner of speaking. Efficient acoustic processing furnishes voice recognizers with enhanced acoustic discrimination power. To this end, a useful characteristic to be analyzed is the short time spectral envelope. Two commonly used spectral analysis techniques for characterizing the short time spectral envelope are linear predictive coding (LPC) and filter-bank-based spectral modeling. Exemplary LPC techniques are described in U.S. Pat. No. 5,414,796, entitled VARIABLE RATE VOCODER, which is assigned to the assignee of the present invention and fully incorporated herein by reference, and L. B. Rabiner & R. W. Schafer, Digital Processing of Speech Signals 396–453 (1978), which is also fully incorporated herein by reference.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. And a hands-free car-kit system would additionally permit the driver to maintain both hands on the steering wheel during call initiation.

Speech recognition devices are classified as either speaker-dependent (SD) or speaker-independent (SI) devices. Speaker-dependent devices, which are more common, are trained to recognize commands from particular users. In contrast, speaker-independent devices are capable of accepting voice commands from any user. To increase the performance of a given VR system, whether speaker-dependent or speaker-independent, training is required to equip the system with valid parameters. In other words, the system needs to learn before it can function optimally.

A speaker-dependent VR device typically operates in two phases, a training phase and a recognition phase. In the training phase, the VR system prompts the user to speak each of the words in the system's vocabulary once or twice (typically twice) so the system can learn the characteristics of the user's speech for these particular words or phrases. An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls in the recognition phase by speaking the trained keywords, which the VR device recognizes by comparing the spoken utterances with the previously trained utterances (stored as templates) and taking the best match. For example, if the name "John" were one of the trained names, the user could initiate a call to John by saying the phrase "Call John." The VR system would recognize the words "Call" and "John," and would dial the number that the user had previously entered as John's telephone number. Systems and methods for training A speaker-independent VR device also uses a training template that contains a prerecorded vocabulary of a predefined size (e.g., certain control words, the numbers zero through nine, and yes and no). A large number of speakers (e.g., 100) must be recorded saying each word in the vocabulary. An example of a speaker-independent VR is the Dynamic Time Warping (DTW) engine described in U.S. Patent Application Ser. No. 09/615,572 entitled METHOD AND APPARATUS FOR CONSTRUCTING VOICE TEMPLATES FOR A SPEAKER-INDEPENDENT VOICE RECOGNITION SYTEM, filed Jul. 13, 2000, which is assigned to the assignee of the present invention and fully incorporated herein by reference.

Different speaker independent VRs may yield different results. For example, a speaker independent (SI) Hidden Markov Model (HMM) engine may yield a different result than a speaker independent Dynamic Time Warping (DTW) engine. Combining the results of both these engines can result in a system with better recognition accuracy and lower rejection rates than using the results of only one of the engines.

A speaker-dependent VR and a speaker independent VR may yield different results. A speaker dependent engine performs recognition using templates pertaining to a specific user. A speaker independent engine performs recognition using templates generated using exemplars from an ensemble of users. Since speaker specific templates are closer to a given user's speaking style, SD engines provide better accuracy than SI engines. However, SI engines have the advantage that the users need not go through the "training process" prior to using the system.

A system and method that combines engines of different types is desired. Combining a speaker dependent VR with a speaker independent VR would provide enhanced accuracy and use a greater amount of information in the input speech signal. Thus, a system and method for resolving different results from a speaker-dependent VR and a speaker independent VR is desired.

SUMMARY OF THE INVENTION

The described embodiments are directed to a system and method for voice recognition that uses combined voice recognition engines. In one aspect, an acoustic processor is configured to extract speech parameters from digitized speech samples of an utterance; a plurality of voice recognition engines are coupled to the acoustic processor, each voice recognition engine producing a hypothesis; and decision logic takes as input the hypotheses from the voice recognition engines and selects a hypothesis.

In another aspect, a method of combining a plurality of voice recognition engines to improve voice recognition is provided. The method advantageously includes extracting speech parameters by an acoustic processor from digitized speech samples of an utterance; coupling a plurality of voice recognition engines to the acoustic processor; producing a hypothesis from each voice recognition engine; and selecting a hypothesis from the hypotheses produced by the plurality of voice recognition engines.

In one embodiment, speaker-independent voice recognition engines are combined. In another embodiment, speaker-dependent voice recognition engines are combined. In yet another embodiment, a speaker-independent voice recognition engine is combined with a speaker-dependent voice recognition engine.

In one embodiment, a speaker-independent voice recognition engine is a Dynamic Time Warping voice recognition engine. In one embodiment, a speaker-independent voice recognition engine is a Hidden Markov Model. In one embodiment, a speaker-dependent voice recognition engine is a Dynamic Time Warping voice recognition engine. In one embodiment, a speaker-dependent voice recognition engine is a Hidden Markov Model.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

In one embodiment, a voice recognition system 100 has three types of voice recognition engines capable of performing isolated word recognition tasks: a dynamic time warping speaker independent (DTW-SI) engine, a dynamic time warping speaker dependent (DTW-SD) engine, a hidden Markov model (HMM) engine. These engines are used for command word recognition and digit recognition to provide rich spoken user interfaces to common tasks performed by a handheld device, such as a mobile phone. In another embodiment, the voice recognition system 100 comprises a DTW-SI and a DTW-SD engine. In yet another embodiment, the voice recognition system 100 comprises a DTW-SI engine and an HMM engine. In yet another embodiment, the voice recognition system 100 comprises a DTW-SD engine and an HMM engine. In one embodiment, the HMM engine is speaker independent. In another embodiment, the HMM engine is speaker dependent.

Figure 1:
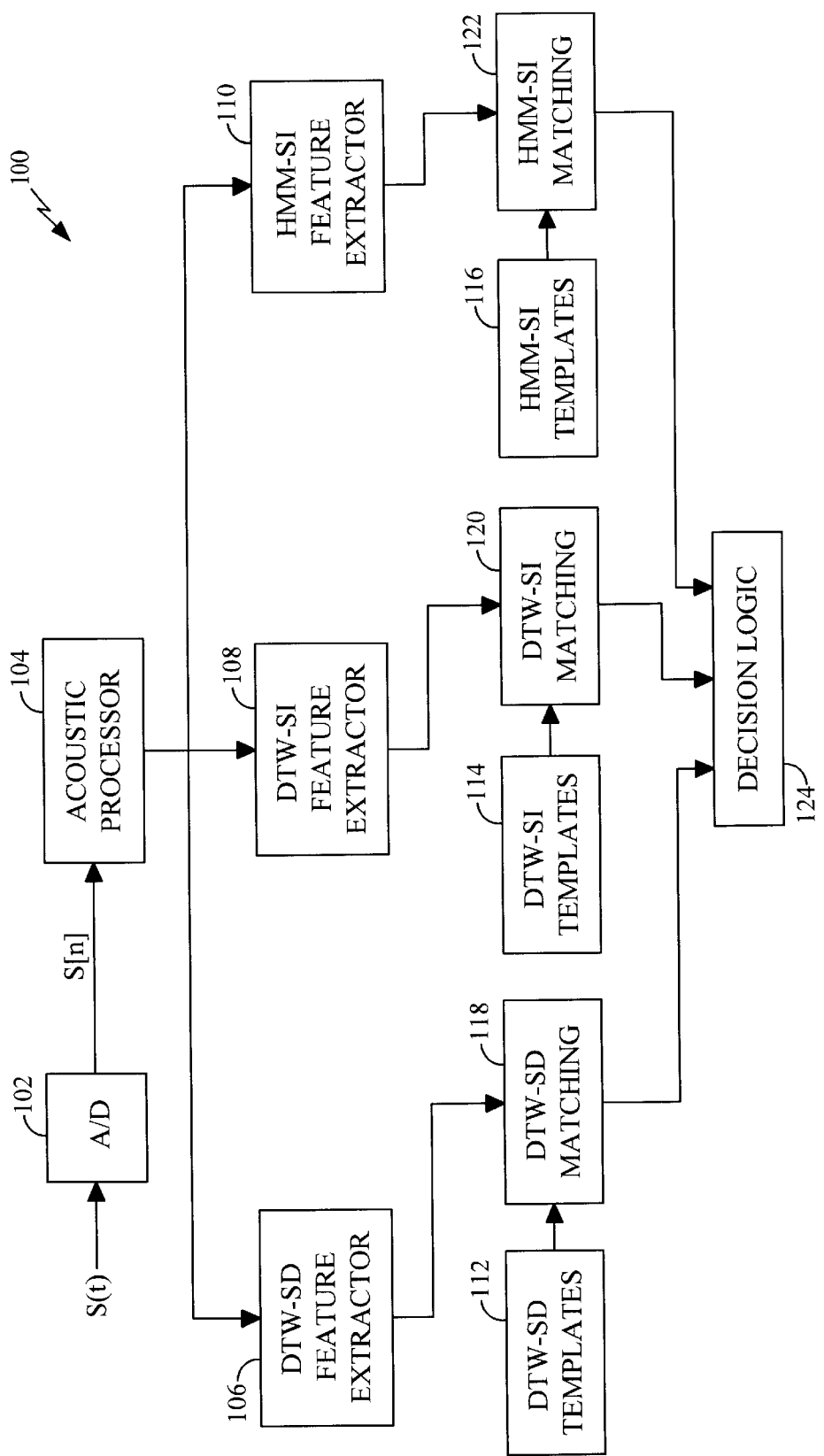
FIG. 1 shows a speech recognition system.

In accordance with one embodiment, as illustrated in FIG. 1, a speech recognition system 100 includes an analog-to-digital converter (A/D) 102, a front-end acoustic processor 104, feature extractors 106, 108, 110, speech template databases 112, 114, 116, matching logic 118, 120, 122 and decision logic 124. In a particular embodiment, the acoustic processor 104 and the feature extractors 106, 108, 110 are implemented as one device, e.g., a parameter extractor.

The A/D 102 is coupled to the acoustic processor 104. The acoustic processor 104 is coupled to the feature extractors 106, 108, 110. A DTW-SD feature extractor 106 is coupled to a DTW-SD matching logic 118. A DTW-SI feature extractor 108 is coupled to a DTW-SI matching logic 120. An HMM feature extractor 110 is coupled to a HMM-matching logic 122. A DTW-SD speech template database 112 is coupled to the DTW-SD matching logic 118. A DTW-SI speech template database 114 is coupled to the DTW-SI matching logic 120. An HMM speech template database 116 is coupled to the HMM matching logic 122. The DTW-SD matching logic 118, DTW-SI matching logic 120, and HMM matching logic 122 are coupled to decision logic 124.

In another embodiment, the speech recognition system 100 includes a DTW-SD feature extractor 106 and a DTW-SI feature extractor, but does not include an HMM-SI feature extractor 110. In yet another embodiment, the speech recognition system 100 includes a DTW-SI feature extractor 108 and an HMM-SI feature extractor 110, but does not include a DTW-SD feature extractor 106. In yet another embodiment, the speech recognition system 100 includes a DTW-SD feature extractor 106 and an HMM-SI feature extractor 110, but does not inlcude a DTW-SI feature extractor 108.

The speech recognition subsystem 100 may reside in, e.g., a wireless telephone or a hands-free car kit. A user (not shown) speaks a word or phrase, generating a speech signal. The speech signal is converted to an electrical speech signal, s(t), with a conventional transducer (not shown). The speech signal, s(t), is provided to the A/D 102, which converts the speech signal to digitized speech samples, s[n], in accordance with a known sampling method such as, e.g., pulse coded modulation (PCM), A-law, or $\mu$-law. In one embodiment, typically, there are N 16-bit speech samples every one second. Thus, N=8,000 for 8,000 Hz sampling frequency and N=16,000 for 16,000 Hz sampling frequency.

The speech samples, s[n], are provided to the acoustic processor 104 for parameter determination. The acoustic processor 104 produces a set of parameters that models the characteristics of the input speech signal, s(t). The parameters may be determined in accordance with any of a number of known speech parameter determination techniques including, e.g., speech coder encoding, discrete Fourier transform (DFT)-based cepstrum coefficients (e.g., fast Fourier transform (FFT)-based cepstrum coefficients), linear predictive coefficients (LPCs), or Bark scale analysis, as described in the aforementioned U.S. Pat. No. 5,414,796 and Lawrence Rabiner & Biing-Hwang Juang, Fundamentals of Speech Recognition (1993). The set of parameters is advantageously frame based (segmented into periodic frames). The acoustic processor 104 may be implemented as a digital signal processor (DSP). The DSP may include a speech coder. Alternatively, the acoustic processor 104 may be implemented as a speech coder.

Figure 2:
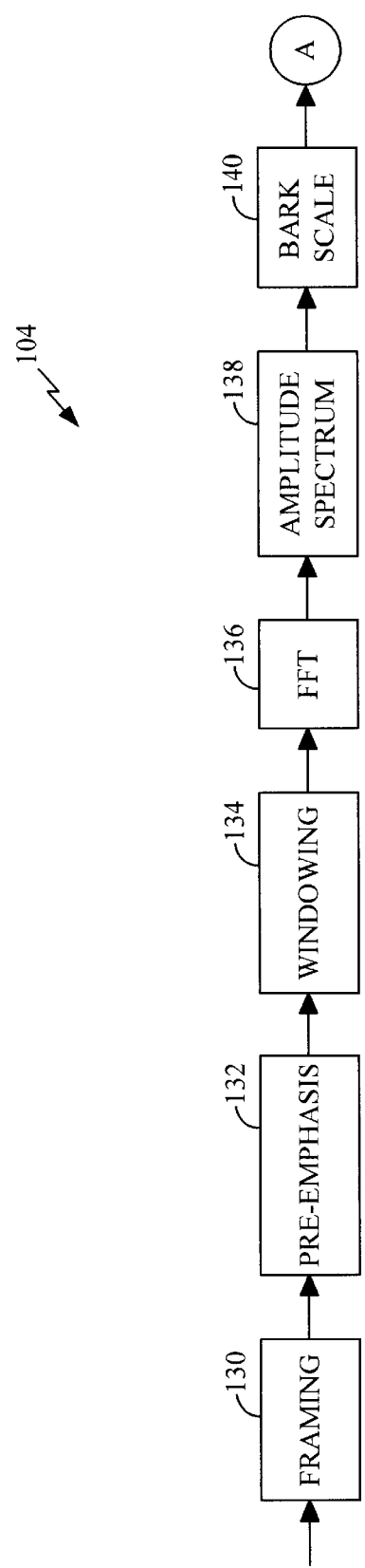
FIG. 2 shows the elements of the acoustic processor.

FIG. 2 shows the elements of the acoustic processor 104 in accordance with one embodiment. The acoustic processor 104 comprises a framing module 130, a pre-emphasis module 132, a windowing module 134, a fast fourier transform (FFT) module 136, an amplitude spectrum module 138, and a Bark scale module 140. In one embodiment, speech samples from the A/D converter 102 are framed by the framing module 130. The framing module 130 frames the speech samples into overlapping blocks, with one block every 10 milliseconds. Each block has 128 to 256 PCM samples.

The pre-emphasis module 132 is a filter that processes the frames from the framing module 130. In one embodiment, the frames are processed through a pre-emphasis filter such as $y(n) = x(n) - ax(n-1)$. In one embodiment, the value of "a" is 0.95 to 0.99.

The pre-emphasized signal is passed through the windowing module 134. The windowing module 134 is a windowing function that provides windowed samples fo the filtered frames. In one embodiment, the windowing function creates a hamming window. In another embodiment, the windowing function creates a trapezoidal window. It would be understood by those skilled in the art, that any windowing function known in the art may be used. For example, the hamming window described in L. B. Rabiner & L. Y. Juang, Fundamentals of Speech Recognition (1993), which is fully incorporated herein by reference, may be used. The windowing function prevents the adverse effects of adding spurious frequency components due to framing.

Each block of windowed samples from the windowing module 134 is converted to the frequency domain by the FFT module 136. The FFT module 136 is a fast fourier transform. In one embodiment, the amplitude spectrum of each block is computed as $A=SQRT(X^*2+Y^*2)$, where A is the amplitude spectrum, X and Y are the real and imaginary parts of the FFT, respectively.

The amplitude spectrum module 138 produces the spectral properties of the signal on a linear frequency scale. The linear frequency scale is transformed by the Bark scale module 140 to an approximate log frequency scale called a Bark scale. There are 64 frequency bins for 128-sample blocks and 128 frequency bins for the 256-sample blocks. The amplitude spectrum module 138 produces results in 16 Bark scale bins corresponding to each amplitude spectrum. That is, the amplitude spectrum module 138 produces 16 Bark amplitudes, one every 10 msec. of the speech signal.

Figure 3:
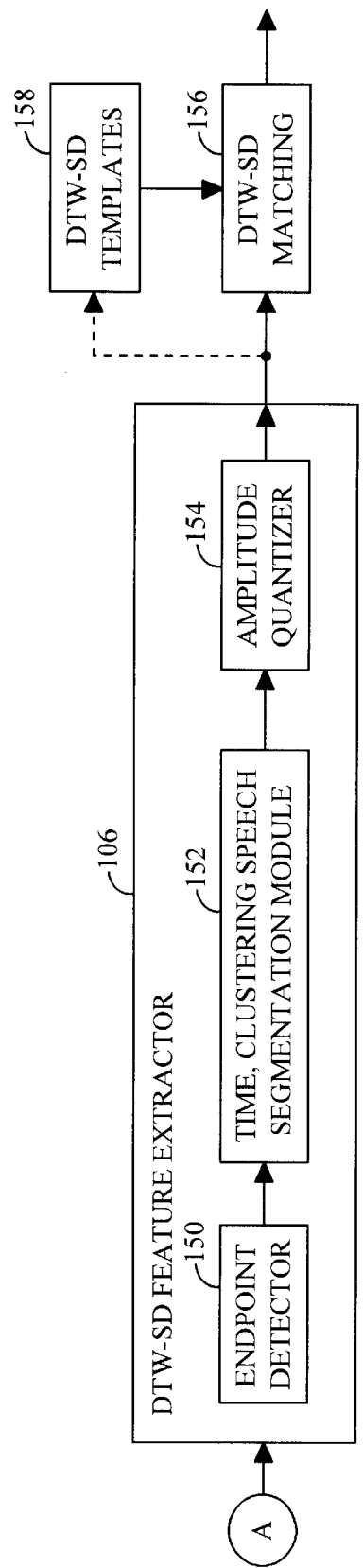
FIG. 3 shows a DTW-SD feature extractor together with a DTW-SD matching module and a DTW-SD templates module.
Figure 4:
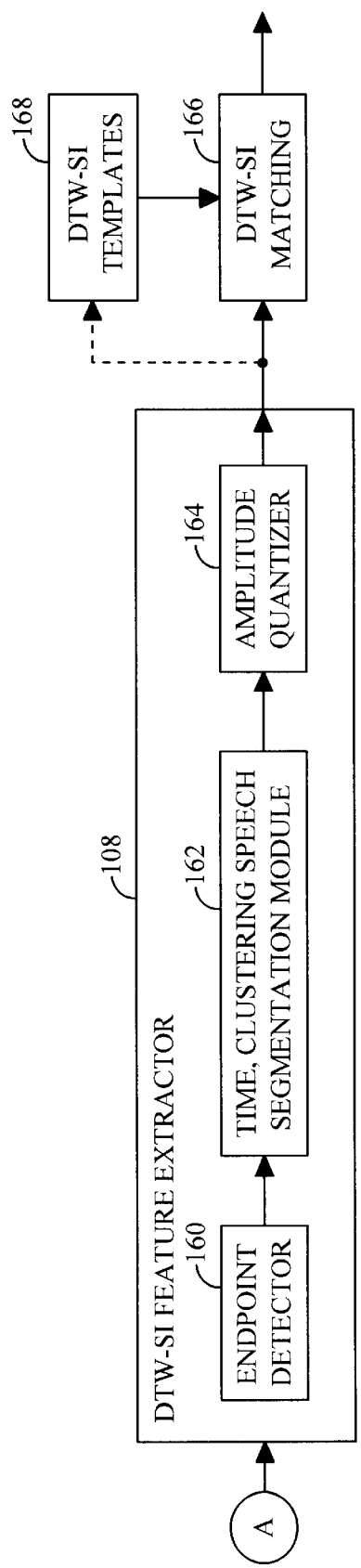
FIG. 4 shows a DTW-SI feature extractor together with a DTW-SI matching module and a DTW-SI templates module.

In one embodiment, the DTW-SI and the DTW-SD feature extractor are the same. FIG. 3 shows a DTW-SD feature extractor 106 together with a DTW-SD matching module 116 and a DTW-SD templates module 158 in accordance with one embodiment. FIG. 4 shows a DTW-SI feature extractor 108 together with a DTW-SI matching module 166 and a DTW-SI templates module 168.

The DTW-SD and the DTW-SI feature extractors comprise an endpoint detector 150, 160, a time-clustering speech segmentation module 152, 162 and an amplitude quantizer 154, 164, respectively. In another embodiment, the DTW-SD feature extractor 106 also comprises a DTW-SD matching module 156 and DTW-SD templates 158. In another embodiment, the DTW-SI feature extractor 108 also comprises a DTW-SI matching module 166 and DTW-SI templates module 168.

In one embodiment, within the DTW-SD feature extractor 106, the endpoint detector 150 is coupled to the time-clustering speech segmentation module 152. The time-clustering speech segmentation module 152 is coupled to the amplitude quantizer 154. The amplitude quantizer 154 is coupled to the DTW-SD matching module 156. The DTW-SD templates module 158 is coupled to the DTW-SD matching module 156. In another embodiment, the amplitude quantizer 154 is coupled to the DTW-SD templates module 158. The DTW-SD templates module 158 comprises DTW-SD templates. In another embodiment, the DTW-SD templates are created during a training phase, in which the DTW-SD part of the system is trained for input speech signals and provides the DTW-SD templates. In another embodiment, the DTW-SI engine, i.e., the DTW-SI feature extractor 108, is used to generate DTW-SD templates "implicitly" during typical usage of the system. In these embodiments, the system has the advantages of both DTW-SD and DTW-SI engines, as long as the results from the DTW-SI and DTW-SD engines are combined properly. Exemplary training systems and methods are described in U.S. patent application Ser. No. 09/248,513 entitled VOICE RECOGNITION REJECTION SCHEME, filed Feb. 8, 1999, which is assigned to the assignee of the present invention and fully incorporated herein by reference, U.S. patent application Ser. No. 09/255,891 entitled SYSTEM AND METHOD FOR SEGMENTATION AND RECOGNITION OF SPEECH SIGNALS, filed Jan. 4, 1999, which is assigned to the assignee of the present invention and fully incorporated herein by reference, and U.S. Patent Application (QCPA000017), entitled METHOD AND APPARATUS FOR CONSTRUCTING VOICE TEMPLATES FOR A SPEAKER-INDEPENDENT VOICE RECOGNITION SYSTEM, Jul. 13, 2000, which is assigned to the assignee of the present invention and fully incorporated herein by reference.

In one embodiment, within the DTW-SI feature extractor 108, the endpoint detector 160 is coupled to the time-clustering speech segmentation module 162. The time-clustering speech segmentation module 162 is coupled to the amplitude quantizer 164. The amplitude quantizer 164 is coupled to the DTW-SI matching module 166. The DTW-SI templates module 168 is coupled to the DTW-SI matching module 166. The DTW-SI templates module 158 comprises DTW-SI templates, which are created during a training phase, in which the DTW-SI part of the system is trained for input speech signals.

Figure 5:
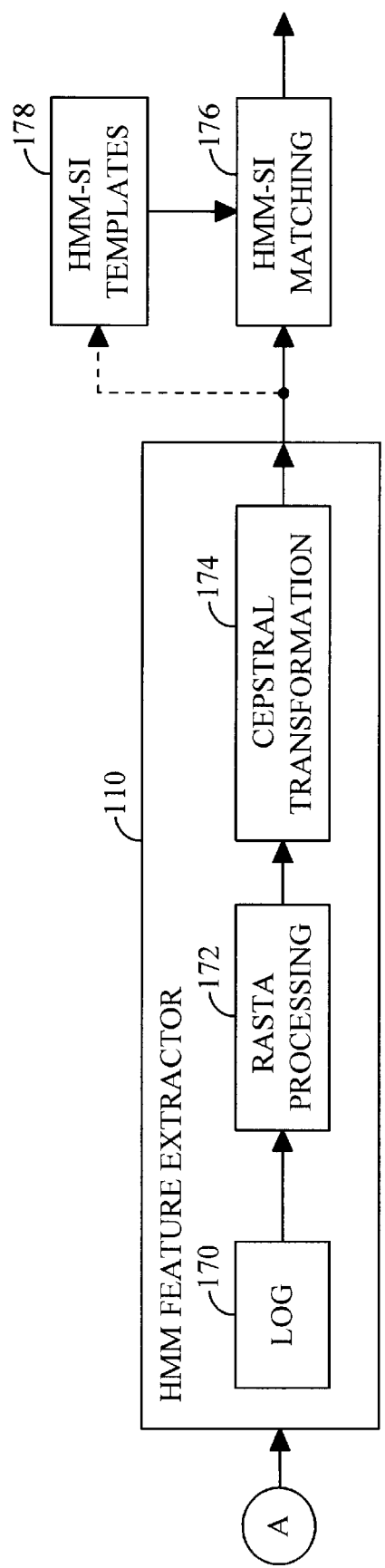
FIG. 5 shows an HMM feature extractor together with an HMM-SI matching module and an HMM-SI templates module.

Another embodiment is shown in FIG. 5. FIG. 5 shows an HMM feature extractor 110 together with an HMM-SI matching module 176 and an HMM-SI templates module 178. The HMM feature extractor 110 comprises a log module 170, a RASTA processing module 172, and a cepstral transformation module 174. The log module 170 is coupled the rasta processing module 172. The RASTA processing module is coupled to the cepstral transformation module 174. SI Hidden Markov Modeling (HMM) Engine. The SI-HMM engine operates in the cepstral domain. The Bark amplitudes are transformed to log scale by the log module 170. The Bark logarithms are filtered with a bandpass filter within the RASTA processing module 172. It would be understood by those skilled in the art, that any RASTA processing known in the art may be used. Exemplary RASTA processing is described in U.S. Pat. No.

5,450,522, entitled AUDITORY MODEL FOR PARAMETRIZATION OF SPEECH, to Hermansky et. al.

Once the Bark algorithms are filtered, a cosine transform is taken within the cepstral transformation module 174. In one embodiment, the resultant feature vectors are matched to HMM models of the target words, i.e. HMM-SI templates, using a Viterbi decoder to find the best match. The HMM models of the target words are generated during the training process. A separate model for male and female speakers is generated during the training process.

Each frame of parameters is provided to the feature extractor 106, 108. In the feature extractor 106, 108, the endpoint detector 150, 160 uses the extracted parameters to detect the endpoints of an utterance (i.e., a word). In one embodiment the endpoint detection is advantageously performed in accordance with a technique described in U.S. application Ser. No. 09/246,414, filed Feb. 8, 1999, entitled METHOD AND APPARATUS FOR ACCURATE ENDPOINTING OF SPEECH IN THE PRESENCE OF NOISE, assigned to the assignee of the present invention, and fully incorporated herein by reference. In accordance with this technique, the utterance is compared with a first threshold value such as, e.g., a signal-to-noise ratio (SNR) threshold value to determine a first starting point and a first ending point of the utterance. A portion of the utterance that precedes the first starting point is then compared with a second SNR threshold value to determine a second starting point of the utterance. A portion of the utterance that follows the first ending point is then compared with the second SNR threshold value to determine a second ending point of the utterance. The first and second SNR threshold values are advantageously recalculated periodically, and the first SNR threshold value advantageously exceeds the second SNR threshold value.

The frames of frequency-domain parameters for the detected utterance are provided to the time-clustering speech segmentation module 152, 162, which in accordance with one embodiment, implements a compression technique described in U.S. application Ser. No. 09/255,891, filed Jan. 4, 1999, entitled SYSTEM AND METHOD FOR SEGMENTATION AND RECOGNITION OF SPEECH SIGNALS, assigned to the assignee of the present invention, and fully incorporated herein by reference. In accordance with this technique, each speech frame in the frequency-domain parameters is represented by at least one spectral value associated with the speech frame. A spectral difference value is then determined for each pair of adjacent frames. The spectral difference value represents a difference between the spectral values associated with the two frames in the pair. An initial cluster boundary is set between each pair of adjacent frames, creating clusters in the parameters, and a variance value is assigned to each cluster. The variance value is advantageously equal to one of the determined spectral difference values. A plurality of cluster merge parameters is then calculated, each of the cluster merge parameters being associated with a pair of adjacent clusters. A minimum cluster merge parameter is selected from the plurality of cluster merge parameters. A merged cluster is then formed by canceling a cluster boundary between the clusters associated with the minimum cluster merge parameter and assigning a merged variance value to the merged cluster. The merged variance value represents the variance values assigned to the clusters associated with the minimum cluster merge parameter. The process is advantageously repeated in order to form a plurality of merged clusters, and the segmented speech signal may advantageously be formed in accordance with the plurality of merged clusters.

It would be understood by those skilled in the art that the time-clustering speech segmentation module 152, 162 may be replaced with other devices such as, e.g., a time normalization module. However, it would also be appreciated by skilled artisans that because the time-clustering speech segmentation module 152, 162 merges the frames having minimum differences as compared to the previous frame into clusters, and uses mean averages instead of individual frames, the time-clustering speech segmentation module 118 uses more information in the processed utterance. It would also be understood that the time-clustering speech segmentation module 152, 162 is advantageously used in conjunction with pattern comparison logic, which is in the decision logic module 124.

In one embodiment of the invention, the decision logic module 124 employs a dynamic time warping (DTW) model as known in the art. In another embodiment of the invention, the decision logic module 124 employs an HMM model. In yet another embodiment, the decision logic module 124 employs both a DTW model and an HMM model.

The cluster means are provided to a speech level normalizer, i.e., the amplitude quantizer 154, 164. In one embodiment the amplitude quantizer 154, 164 quantizes the speech amplitudes by assigning each cluster mean two bits per channel (i.e., two bits per frequency). In an alternate embodiment in which cepstral coefficients are extracted, the amplitude quantizer 154, 164 is not used to quantize the cluster means, as would be understood by those of skill. The output generated by the amplitude quantizer 154, 164 is provided by the feature extractor 106, 108 to the decision logic 124.

A set of templates for all of the vocabulary words of the speech recognition subsystem 100 is stored in the template databases 158, 168, 178. In one embodiment, the set of templates is constructed with a speaker-independent template building subsystem. The template databases 158, 168, 178 are advantageously implemented as any conventional form of nonvolatile storage medium, such as, e.g., flash memory. This allows the templates to remain in the template database 158, 168, 178 when the power to the speech recognition subsystem 100 is turned off.

Figure 6:
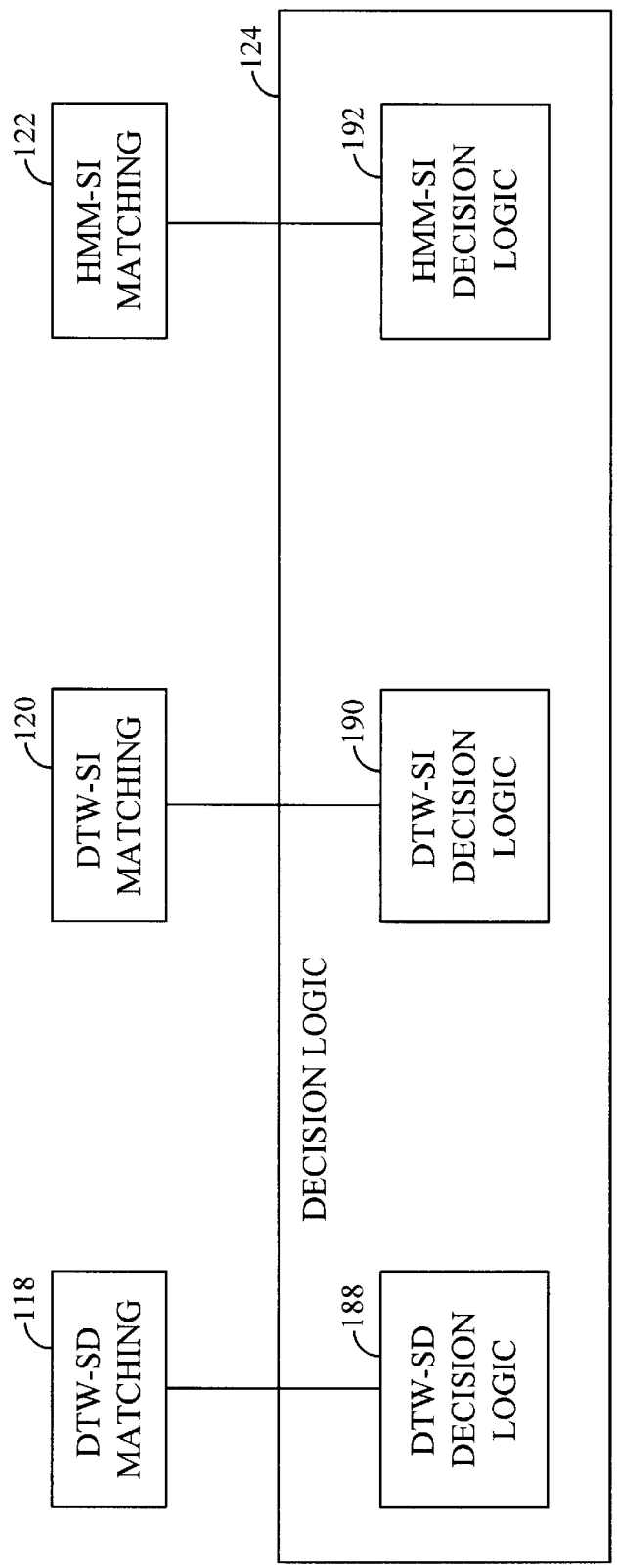
FIG. 6 shows components of the decision logic module in one embodiment.

In one embodiment, the decision logic 124 comprises a DTW-SD decision logic 188, a DTW-SI decision logic 190 and an HMM decision logic 192, wherein the DTW-SD matching module 118 is coupled to the DTW-SD decision logic 188, the DTW-SI matching module 120 is coupled to the DTW-SI decision logic 190 and the HMM matching module 122 is coupled to the HMM decision logic 192, as shown in FIG. 6. In another embodiment, the DTW-SD decision logic 188, the DTW-SI decision logic and the HMM-SI decision logic are unified. It would be apparent to those skilled in the art that the decision logics 188, 190, 192 can be configured in any combination.

The matching module 118, 120, 122 of the respective engine compares the vectors from its feature extractor 106, 108, 110 to all of the templates stored in the respective template database 112, 114, 116. The comparison results, or distances, between the vectors and all of the templates stored in the template database 112, 114, 116 are provided to the respective decision logic 188, 190, 192. The decision logic 188, 190, 192 selects from the respective template database 112, 114, 116 the template that most closely matches the vectors. In the alternative, the decision logic 188, 190, 192 may use a conventional "N-best" selection algorithm, which chooses the N closest matches within a predefined matching threshold. The user is then queried as to which choice was intended. The output of the decision logic 188, 190, 192 is the decision as to which word in the vocabulary was spoken.

In one embodiment the DTW matching modules 118, 120 and decision logic 188, 190 use a DTW technique to test for convergence. The DTW technique is known in the art and described in Lawrence Rabiner & Biing-Hwang Juang, *Fundamentals of Speech Recognition* 200–238 (1993), which is fully incorporated herein by reference). In accordance with the DTW technique, a trellis is formed by plotting a time sequence of the utterance to be tested against a time sequence for each utterance stored in the template database 108. The utterance being tested is then compared, point by point (e.g., every 10 ms), with each utterance in the template database 108, one utterance at a time. For each utterance in the template database 108, the utterance being tested is adjusted, or "warped," in time, being either compressed or expanded at particular points until the closest possible match with the utterance in the template database 108 is achieved. At each point in time the two utterances are compared, and either a match is declared at that point (zero cost), or a mismatch is declared. In the event of a mismatch at a particular point, the utterance being tested is compressed, expanded, or if necessary, mismatched. The process is continued until the two utterances have been completely compared against each other. A large number (typically thousands) of differently adjusted utterances is possible. The adjusted utterance having the lowest cost function (i.e., requiring the least number of compressions and/or expansions and/or mismatches) is selected. In similar fashion to a Viterbi decoding algorithm, the selection is advantageously performed by looking backward from each point in the utterance in the template database 108 to determine the pathway having the lowest total cost. This permits the lowest-cost (i.e., most closely matched) adjusted utterance to be determined without resorting to the "brute-force" method of generating every possible one of the differently adjusted utterances. The lowest-cost adjusted utterances for all of the utterances in the template database 108 are then compared and the one having the lowest cost is selected as the stored utterance most closely matched to the tested utterance.

Although the DTW matching schemes 118, 120 and Viterbi decoding in HMM systems are equivalent, the DTW and HMM engines utilize different front end schemes, i.e., feature extractors, to provide feature vectors to the matching stage. For this reason, the error patterns of the DTW and HMM engines are quite different. A voice recognition system 100 with a combined engine takes advantage of difference in error patterns. By combining the results from both the engines properly, a higher overall recognition accuracy may be achieved. More importantly, lower rejection rates for desired recognition accuracy may be achieved.

In an isolated voice recognition system, the probability of matching an utterance to a target word can be written as:

$$P(W_i, X) = \max(\Pi \exp((\Lambda ij - xj)/\sigma)2)$$

Wi is the target word i modeled by a set of mean vectors $\Lambda i$ and variance $\sigma$. In addition to $W_i$, there is a garbage model Wg. If an utterance X does not correspond to any of the vocabulary words $W_i$, Wg is expected to yield a very low cost, which means that the utterance X is garbage and is not any of the vocabulary words. Wg is built during the training process. It would be understood by those skilled in the art, that any garbage modeling scheme known in the art may be used.

The utterance X is the series of feature vectors xj. In one embodiment, variance $\sigma$ is unity and the minimization is always over 20 frames (i.e. j =1 . . . 20) in the DTW scheme. Minimization is the process of choosing the word hypothesis with the lowest cost. A hypothesis is a word, token, or string of words or tokens. A token is a speech segment corresponding to a phrase, word, or subword.

In the HMM scheme of one embodiment, j =1 . . . N, where N is the utterance length. Furthermore, a diagonal covariance vector is used in modeling, instead of a unit vector.

Other than the above two differences between DTW and HMM, both DTW and HMM engines generate a probability measure for each of the target words. This implies the capacity to multiply a DTW probability (PDTW ($W_i$, X)) and a HMM probability (PHMM ($W_i$, X)) to maximize the probability across both the engines. In practice, instead of maximizing the probability, the cost of matching an utterance X with a word $W_i$ is minimized for computational efficiency. The cost is defined as:

$$C(W_i, X) = -\text{Log}(P(W_i, X)) = \min(\Sigma((\Lambda ij - xj)/\sigma)^2)$$

Thus, the combined cost of matching utterance X with word $W_i$, is given as $$C(W_i, X) = CDTW(W_i, X) + \gamma^* CHMM(W_i, X),$$

where $\gamma$ is the scaling factor. This is similar to the language modeling cost used in large vocabulary dictation systems, where the acoustic model cost and the language model cost are combined with proper scaling factors.

In one embodiment, speaker-independent voice recognition engines operating the same vocabulary set are combined. In another embodiment, speaker-dependent voice recognition engines are combined. In yet another embodiment, a speaker-independent voice recognition engine is combined with a speaker-dependent voice recognition engine, both engines operating on the same vocabulary set. In yet another embodiment, a speaker-independent voice recognition engine is combined with a speaker-dependent voice recognition engine, both engines operating on different vocabulary sets.

Figure 7:
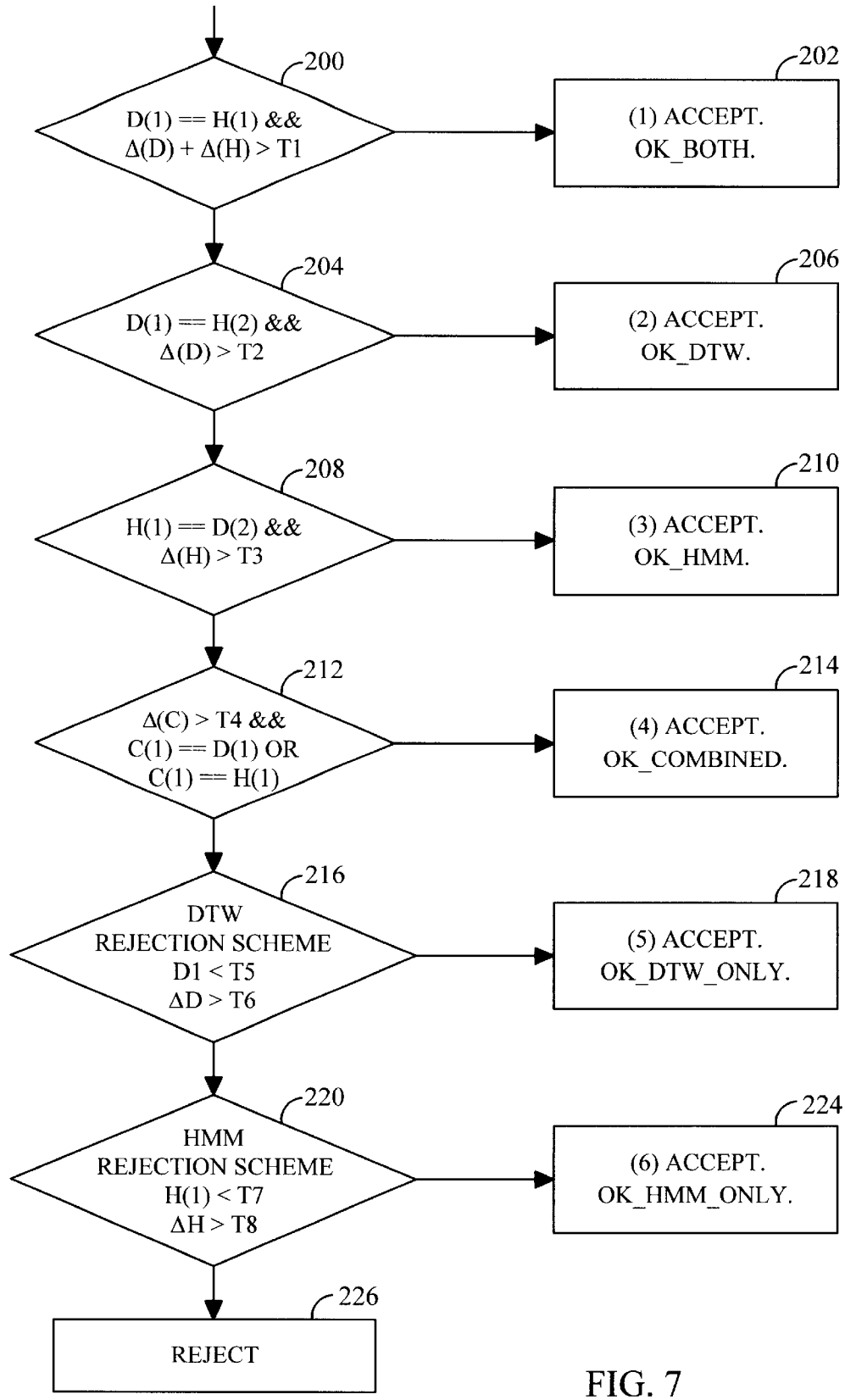
FIG. 7 shows the flow diagram for combined engine logic for command words with no speaker adaptation in one embodiment.

FIG. 7 shows a flow diagram for combined engine logic with no speaker adaptation in one embodiment. Speaker adaptation is the training explicitly or implicitly of templates.

$\gamma$=20/N, where N is the utterance duration in frames.

D(i)=Cost for DTW Hypothesis i

H(i)=Cost for HMM Hypothesis i

C(i)=Cost for Combined Hypothesis i $\Delta$(D)=DTW Delta Cost=D(2)–D(1)

$\Delta$(H)=HMM Delta Cost=H(2)–H(l)

$\Delta$(C)=Combined Delta Cost.=C(garbage)–C(1).

Garbage cost is used in computing $\Delta$(C).

In the first stage 200, the algorithm checks to see if the top candidate is the same for both DTW and HMM. The total delta cost against threshold T1 is used as a boundary check 202. If the DTW Top and the HMM Top Agree, then both DTW and HMM hypotheses are accepted. If they do not agree, then control flow proceeds to the second stage 204.

In the second stage 204, the algorithm recovers the utterances where DTW is correct and HMM is 2nd best. In the second stage 204, we check to see if the DTW top candidate agrees with the $2^{nd}$ HMM candidate. If the DTW Top agrees with the $2^{nd}$ HMM, then accept DTW hypothesis. If they do not agree, then control flow proceeds to the third stage 208. The DTW delta cost threshold T2 is used as a boundary check 206.

In the third stage 208, the algorithm recovers the utterances where HMM is correct and DTW is 2nd best. In the third stage 208, the algorithm checks to see if the HMM candidate agrees with the $2^{nd}$ DTW candidate. If the HMM candidate agrees with the $2^{nd}$ DTW candidate, then the HMM hypothesis is accepted. If they do not agree, then control flow proceeds to the fourth stage 212. The HMM delta cost threshold T3 is used as a boundary check 210.

In the fourth stage 212, the DTW and HMM scores are combined with proper scaling. In the fourth stage 212, we check to see if $\Delta(C)$ is greater than threshold T4 and if the top combined hypothesis is the same as either DTW top hypothesis or HMM top hypothesis. If yes, then accept the combined hypothesis. If not, then go to the fifth stage 216. For computing the combined delta costs, the algorithm uses the garbage cost since the words proposed by both the engines need not be the same. The algorithm makes sure the top candidate matches with either DTW or HMM top candidate as a boundary check.

In the fifth stage 216, the algorithm checks for DTW Based Rejection Only, which is based on DTW cost, delta cost and garbage cost. This stage also operates as the sole rejection scheme when only DTW templates are loaded in a platform. If DTW rejection scheme condition is true, then accept the top DTW hypothesis. If DTW rejection scheme condition is false, control flow proceeds to the sixth stage 220. The DTW rejection scheme condition is true when the cost of the top candidate is less than threshold T5 and the delta DTW cost $\Delta(C)$ is greater than threshold T6.

In the sixth stage 220, the algorithm checks for HMM Based Rejection Only, which is based on HMM cost, delta cost and garbage cost. This stage also operates as the sole rejection scheme when only HMM templates are loaded in the platform. If HMM rejection scheme condition is true, then the algorithm accepts the top HMM hypothesis. If HMM rejection scheme condition is false, then control flow proceeds to the seventh stage 226. The HMM rejection scheme condition is true when the cost of the top candidate is less than threshold T7 and the delta HMM cost $\Delta(H)$ is greater than threshold T8.

Exemplary rejection schemes are described in U.S. patent application Ser. No. 09/248,513 entitled VOICE RECOGNITION REJECTION SCHEME, filed Feb. 8, 1999, which is assigned to the assignee of the present invention and fully incorporated herein by reference.

Figure 8:
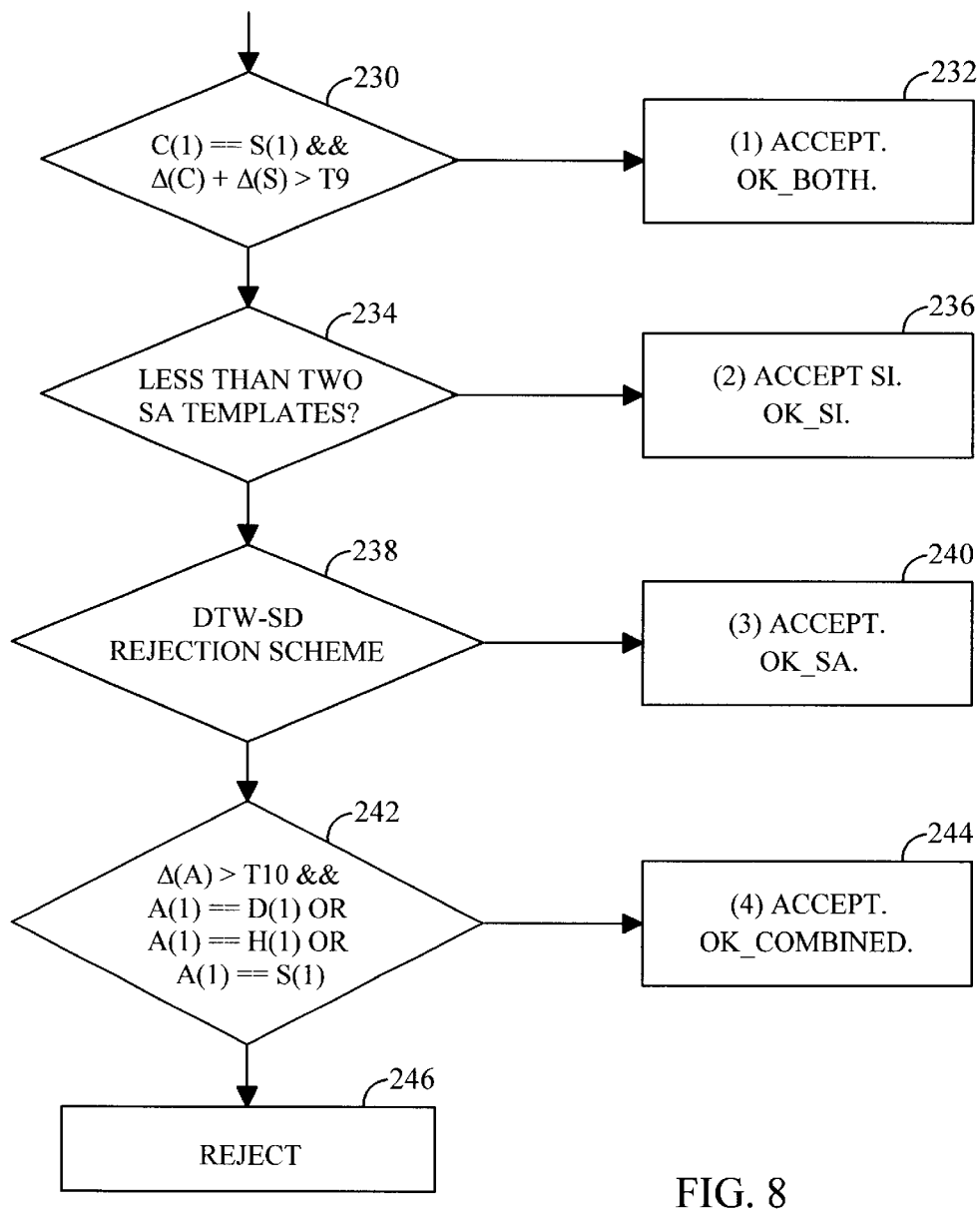
FIG. 8 shows the flow diagram for combined engine logic for command words with speaker adaptation.

In one embodiment, the combined engine logic is for command words and has speaker adaptation. FIG. 8 shows a flow diagram for combined engine logic for command words with speaker adaptation in accordance with one embodiment. S(.) corresponds to the Speaker Adapted results from the speaker dependent engine. C(.) corresponds to the Speaker independent results from the combined engine with no adaptation. A(.) corresponds to merging SI and SA results and reordering the hypotheses.

In the first stage 230, the algorithm checks to see if the top candidate is the same for both C(1) and S(1). The total delta cost against threshold T9 is used as a boundary check. If the C(1) and S(1) agree, then both C(1) and S(1) hypotheses are accepted 232. If they do not agree, then the control flow proceeds to the second stage 234.

In the second stage 234, the algorithm checks whether there are less than two speaker-adaptive templates. If there are less than two speaker-adaptive template, then the control flow accepts the speaker independent hypothesis 236. If not, then control flow proceeds to the third stage 238.

In the third stage 238, a DTW Rejection Scheme is applied. If the DTW rejection scheme condition is true, then the algorithm accepts the speaker adaptive hypothesis 240. If the DTW rejection scheme condition is false, then control flow proceeds to the fourth stage 242.

In the fourth stage 242, $\Delta(A)$ is compared to threshold T10. If $\Delta(A)$ is greater than the threshold T10 and A(1) is equal to D(1), H(1), or S(1), a combined hypothesis is accepted 244. If not, then the combined hypothesis is rejected 246.

When there are less than two speaker adapted templates, more emphasis is given to the combined SI engine. When there are more than two speaker-adaptive templates, more emphasis is given to the SD engine.

Figure 9:
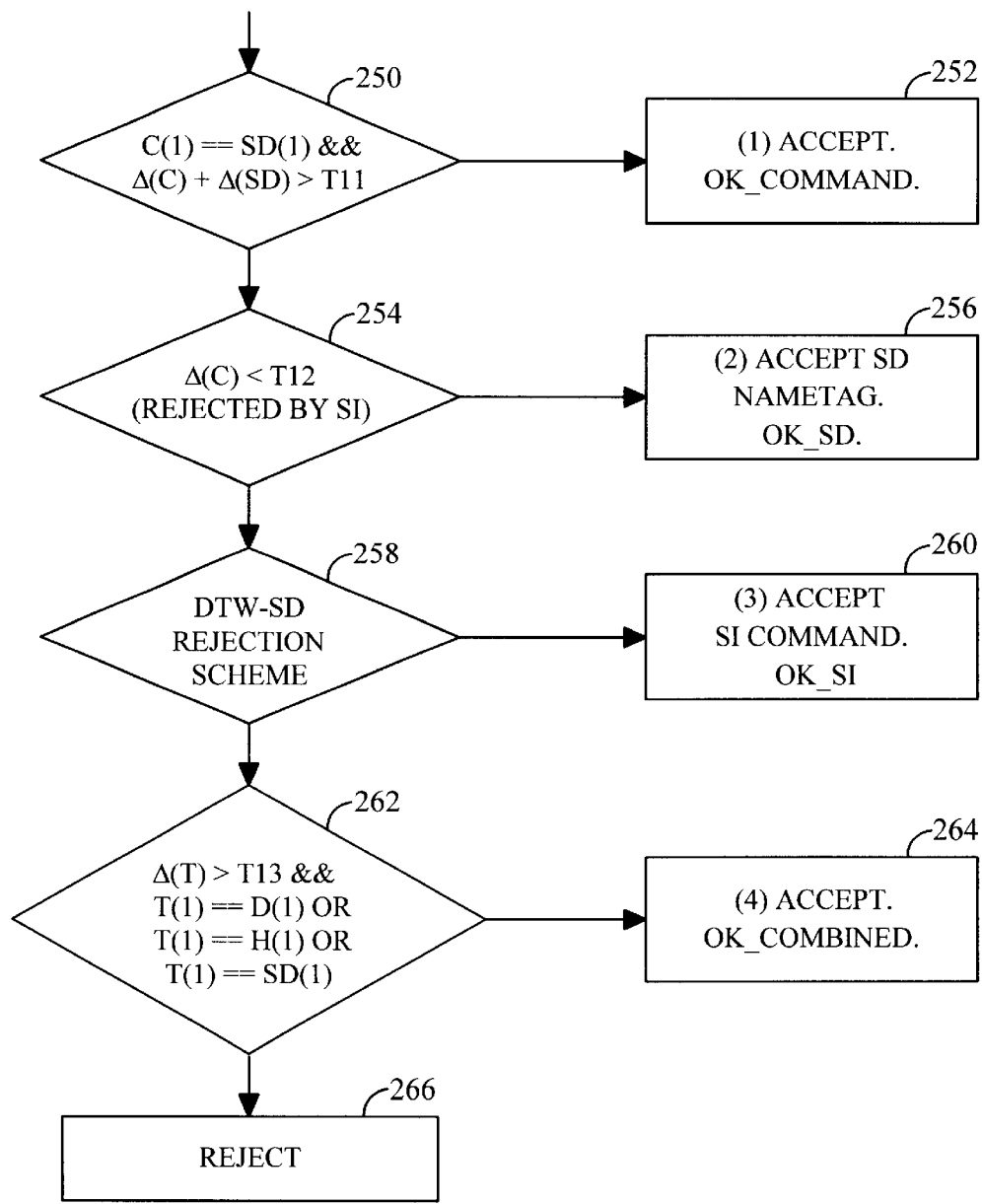
FIG. 9 shows the flow diagram for combined engine logic for command words and nametags with speaker adaptation.

In another embodiment, the combined engine logic is for command words and nametags and has speaker adaptation. Nametags are vocabulary words that are enrolled by a user. FIG. 9 shows a flow diagram for combined engine logic for command words and nametags with speaker adaptation in accordance with one embodiment.

SD(.) corresponds to the Speaker Dependent engine. C(.) corresponds to the Speaker independent results from the combined engine with no adaptation. T(.) corresponds to merging SI and SD results and reordering the hypotheses.

In the first stage 250, the algorithm checks to see if the top candidate is the same for both C(1) and SD(1). The total delta cost against threshold T11 is used as a boundary check. If the C(1) and SD(1) agree, then the command is accepted 252. If they do not agree, then control flow proceeds to the second stage 254.

In the second stage 254, $\Delta(C)$ is compared to threshold T12. If $\Delta(C)$ is less than threshold T12, then the nametag is accepted 256. If not, then control flow proceeds to the third stage 258.

In the third stage 258, a DTW Rejection Scheme is applied. If the DTW rejection scheme condition is true, then the algorithm accepts the speaker independent command 260. If the DTW rejection scheme condition is false, then control flow proceeds to the fourth stage 262.

In the fourth stage 262, $\Delta(T)$ is compared to threshold T13. If $\Delta(T)$ is greater than the threshold T13 and T(1) is equal to D(1), H(1), or SD(1), a combined hypothesis is accepted 264. If not, then the combined hypothesis is rejected 266.

In the hybrid scheme, the speaker dependent engine is generating nametag hypotheses. The speaker independent engine is generating command word hypotheses. Additionally, if there are any speaker adapted templates, the speaker dependent engine generates command word hypotheses.

Typically, there are a few tens of nametags and a few command words (such as "PhoneBook, Redial, VoiceMemo and Email).

The user can speak a nametag or a command word at the top level.

Without the hybrid engine, the user will have to say "Command" followed by the Task. (e.g. Call—John$_{13}$ Jones; Command—PhoneBook). With the hybrid engine, the user can say "John Jones" or PhoneBook. Results in a user interface.

The thresholds Ti used on the Combined-SI logic, Combined-SA logic and the Combined-Hybrid logic are optimized using a development set of utterances from an ensemble of speakers. In one embodiment, the optimization is done manually.

In another embodiment, an automated procedure such as Least Squares Minimization (LMS) process is used to optimize the thresholds Ti. In one embodiment, the automated procedure considers each of the top N hypotheses from each engine as the correct answer and constructs a vector of parameters for each hypothesis. In one embodiment, an example of such a vector is [Δ(D) Δ(Dg) Δ(H) Δ(Hg)] where Δ(?) is the difference in costs between the hypothesis under consideration and the next best hypothesis of that engine. Δ(Dg) Δ(Hg) correspond to the cost difference between the hypothesis under consideration and the garbage cost of the DTW and HMM engines, respectively.

As an example, consider the top two hypotheses from each engine: There could be at the most four (4) candidates for the answer, out of which only one is the correct answer. The training process generates a set of four weights a, b, c and d that maximize the weighted sum of (a * Δ(D)+b * Δ(Dg)+c* Δ(H)+d* Δ(Hg)) for the correct hypothesis and minimize the weighted sum for incorrect hypotheses.

Thus, a novel and improved method and apparatus for combining engines for voice recognition has been described. Those of skill in the art would understand that the various illustrative logical blocks, modules, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, and algorithm steps described in connection with the embodiments disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The feature extractors 106, 108, 110, matching modules 118, 120, 122 and decision logic 124 may advantageously be executed in a microprocessor, but in the alternative, the feature extractors 106, 108, 110, matching modules 118, 120, 122 and decision logic 124 may be executed in any conventional processor, controller, microcontroller, or state machine. The templates could reside in RAM memory, flash memory, ROM memory, EPROM memory, EEPROM memory, registers, hard disk, a removable disk, a CD-ROM, or any other form of storage medium known in the art. As illustrated in FIG. 1, the matching modules 118, 120, 122 are advantageously coupled to a template module 112, 114, 116, respectively, so as to read information from the template module 112, 114, 116, respectively. The memory (not shown) may be integral to any aforementioned processor. A processor and memory (not shown) may reside in an ASIC (not shown). The ASIC may reside in a telephone.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A voice recognition system, comprising:

an acoustic processor configured to extract speech parameters from digitized speech samples of an utterance;

a plurality of voice recognition engines coupled to the acoustic processor, each voice recognition engine configured to produce a plurality of hypotheses; and decision logic configured to compare a most likely hypothesis of a first voice recognition engine to a second most likely hypothesis of the first voice recognition engine to form a first difference, delta 1;

compare a most likely hypothesis of the second voice recognition engine to a second most likely hypothesis of the second voice recognition engine to form a second difference, delta 2;

add delta 1 and delta 2 to form a delta sum; and accept the most likely hypothesis of the first voice recognition engine if the most likely hypothesis of the first voice recognition engine is equal in likeliness to the most likely hypothesis of the first voice recognition engine and the delta sum is greater than a first predetermined threshold.

2. The voice recognition system of claim 1, wherein the plurality of voice recognition engines includes a speaker-independent voice recognition engine.

3. The voice recognition system of claim 1, wherein the plurality of voice recognition engines includes a speaker-dependent voice recognition engine.

4. The voice recognition system of claim 2, wherein the plurality of voice recognition engines includes a speaker-dependent voice recognition engine.

5. The voice recognition system of claim 4, wherein the plurality of voice recognition engines includes a speaker-independent Dynamic Time Warping voice recognition engine.

6. The voice recognition system of claim 4, wherein the plurality of voice recognition engines includes a speaker-independent Hidden Markov Model voice recognition engine.

7. The voice recognition system of claim 4, wherein the plurality of voice recognition engines includes a speaker-dependent Dynamic Time Warping voice recognition engine.

8. The voice recognition system of claim 4, wherein the plurality of voice recognition engines includes a speaker-dependent Hidden Markov Model recognition engine.

9. The voice recognition system of claim 4, wherein the plurality of voice recognition engines includes a speaker-dependent Dynamic Time Warping voice recognition engine and a speaker-independent Dynamic Time Warping engine.

10. A method for voice recognition, comprising:

extracting speech parameters with an acoustic processor from digitized speech samples of an utterance;

coupling a plurality of voice recognition engines to the acoustic processor; and producing a plurality of hypotheses from each voice recognition engine;

comparing the most likely hypothesis of the first voice recognition engine to the second most likely hypothesis of the first voice recognition engine to form a first difference, delta 1;

comparing the most likely hypothesis of the second voice recognition engine to the second most likely hypothesis of the second voice recognition engine to form a second difference, delta 2;

adding delta 1 and delta 2 to form a delta sum; and accepting the most likely hypothesis of the first voice recognition engine if the most likely hypothesis of the first voice recognition engine is equal in likeliness to the most likely hypothesis of the first voice recognition engine and the delta sum is greater than a first predetermined threshold.

11. A method as in claim 10 wherein the most likely hypothesis of the first voice recognition engine is not equal in likeliness to the most likely hypothesis of the first voice recognition engine and/or the delta sum is not greater than a predetermined threshold, the method further comprising:

comparing the most likely hypothesis of the first voice recognition engine to the second most likely hypothesis of the second voice recognition engine and, if the likeliness of the most likely hypothesis of the first voice recognition engine is equal to the likeliness of the second most likely hypothesis of the second voice recognition 2 engine and delta 1 is greater than a second predetermined threshold, accepting the most likely hypothesis of the fist voice recognition engine.

12. A method as in claim 11 wherein the most likely hypothesis of the first voice recognition engine is not equal in likeliness to the most likely hypothesis of the first voice recognition engine and/or the delta sum is not greater than a predetermined threshold, the method further comprising:

comparing the most likely hypothesis of the second voice recognition engine to the second most likely hypothesis of the first voice recognition engine and, if the likeliness of the most likely hypothesis of the second voice recognition engine is equal to the likeliness of the second most likely hypothesis of the first voice recognition 2 engine and delta 2 is greater than a third predetermined threshold, accepting the most likely hypothesis of the second voice recognition engine.

13. The method of claim 10 wherein the voice recognition engines are selected from the group consisting of speaker independent Dynamic Time Warping, speaker independent Hidden Markov Model, speaker dependent Dynamic Time Warping, speaker dependent Hidden Markov Model.

14. The method of claim 11 wherein the voice recognition engines are selected from the group consisting of speaker independent Dynamic Time Warping, speaker independent Hidden Markov Model, speaker dependent Dynamic Time Warping, speaker dependent Hidden Markov Model.

15. The method of claim 12 wherein the voice recognition engines are selected from the group consisting of speaker independent Dynamic Time Warping, speaker independent Hidden Markov Model, speaker dependent Dynamic Time Warping, speaker dependent Hidden Markov Model.

\* \* \* \* \*

UNITED STATES PATENT AND TRADEMARK OFFICE
CERTIFICATE OF CORRECTION

PATENT NO. : 6,671,669 B1
DATED : December 30, 2003
INVENTOR(S) : Harinath Garudadri et al .

It is certified that error appears in the above-identified patent and that said Letters Patent is hereby corrected as shown below:

<u>Column 14,</u>
Line 23, please change "first" to -- second --.

Signed and Sealed this

Twenty-ninth Day of November, 2005

JON W. DUDAS
*Director of the United States Patent and Trademark Office*